United States Patent [19]

Doblinger

[11] Patent Number: 5,043,124

[45] Date of Patent: Aug. 27, 1991

[54] METHOD FOR TREATMENT OF SUPPORT RODS

[75] Inventor: Heinz Doblinger, Emmering-Fürstenfeldbruck, Fed. Rep. of Germany

[73] Assignee: Hebel GmbH Holding, Fürstenfeldbruck, Fed. Rep. of Germany

[21] Appl. No.: 479,947

[22] Filed: Feb. 14, 1990

[30] Foreign Application Priority Data

Feb. 25, 1989 [DE] Fed. Rep. of Germany ....... 3905973

[51] Int. Cl.$^5$ .............................................. B32B 31/12

[52] U.S. Cl. .................................... 264/135; 427/156; 427/403; 264/221; 264/317; 264/218

[58] Field of Search ........................ 427/435, 156, 403; 264/135, 221, 317, 218

[56] References Cited

U.S. PATENT DOCUMENTS

| | | | |
|---|---|---|---|
| 4,444,803 | 4/1984 | Winters et al. | 427/435 |
| 4,465,710 | 8/1984 | Uchiyama et al. | 264/135 X |
| 4,647,309 | 3/1987 | Hayner | 427/435 |

*Primary Examiner*—Shrive Beck

*Assistant Examiner*—Alain Bashore

*Attorney, Agent, or Firm*—Flynn, Thiel, Boutell & Tanis

[57] ABSTRACT

It is a method of treatment of support rods for the support of steel reinforcements in making aerated concrete, in which the support rods are first dipped into a hot bath of molten paraffin or a similar wax-like, waterproof material, which is solid at room temperature and has a softening temperature of about 50° to 70° C. Then the coating formed thereby is hardened by cooling. Then the steel reinforcements are suspended on the support rods and they, together with the support rods are coated with a corrosion protection medium in the form of a water-lacquer.

12 Claims, No Drawings

METHOD FOR TREATMENT OF SUPPORT RODS

FIELD OF THE INVENTION

This invention relates to a method for the treatment of support rods for holding steel reinforcement in the production of aerated concrete, in which the support rods are first immersed in a liquid separating medium, then the coating formed thereby is hardened, then the steel reinforcement is hung on the support rods and coated together with the support rods with a corrosion protection medium.

BACKGROUND OF THE INVENTION

In the production of reinforced aerated concrete elements it is necessary to provide the steel reinforcements (reinforcing mats and reinforcing bodies) with a corrosion protection coating, before introduction into the viscously fluid aerated concrete. In order to apply the corrosion protection medium to the steel reinforcements, these are as a rule dipped in a bath filled with the corrosion protection medium. To hold the steel reinforcements during this dipping operation there are provided so-called support rods, of which a plurality are each fixed to a cross-piece or a frame. In dipping the steel reinforcements into the corrosion protection medium the support rods are also coated with the corrosion protection medium. After the corrosion protection medium has dried, the reinforcements can be put in the casting mould. To this end the cross-pieces are placed on the upper edge of the casting mould. The support rods now hold the steel reinforcements suspended thereon at the correct mutual spacings and spacing from the mould bottom and the sidewalls of the mould. Then the aerated concrete mass is filled into the mould. It blows up to the required height under the action of aluminium powder. After the so-called green aerated concrete block has attained sufficient strength to be transported and cut, the support rods are released from the steel reinforcements and withdrawn upwardly from the aerated concrete block by lifting the cross-pieces. Before they can be reused, cleaning of these support rods is necessary as a rule, on the one hand because they are likewise coated with the corrosion protection medium and on the other hand because inter alia aerated concrete residues adhere to the corrosion protection medium. If the corrosion protection coating and possible aerated concrete residues are not removed, the support rods would be coated with a further coating layer on renewed dipping in the corrosion protection medium bath, likewise the aerated concrete particles adhering to the rod. In this manner the coating on the support rods would become ever thicker. This has the consequence that the support rods can no longer be inserted from above through bores in the cross-pieces and also can no longer be withdrawn. Aerated concrete particles which adhere to the support rods and are fixed by a new coating would moreover form projections on the support rods, which make withdrawal from the hardened aerated concrete block difficult and can also lead to damage to the same during withdrawal. For these reasons the support rods must be cleaned after the withdrawal from the hardened aerated concrete block, which is very expensive and for which large quantities of solvent are necessary. Since these solvents are mostly a fire-risk, substantial protective measures are also necessary. Moreover the use of solvents is less friendly to the environment.

The desire for an environmentally friendly corrosion protection system has given the impetus to develop a water-lacquer, i.e. a water-thinned lacquer. This water-lacquer forms an irreversible film, i.e. once it has dried the corrosion protection coating can no longer be dissolved with water or solvents. Support rods, which are therefore dipped in a bath of water-lacquer together with the steel reinforcements hanging thereon can no longer be made lacquer-free with aid of solvents after drying of the water-lacquer.

In a known method of the initially mentioned kind (DE-OS 3 640 029) a water-based separating medium is applied to the support rods before applying the corrosion protection medium. This consists of 1.4 to 2.5 weight-% cellulose-glycol acid, 44 to 52.6 weight-% of an inert inorganic powder such as slate dust, talcum, kaolin, quartz powder, and 46 to 53.5 weight-% water. These components are stirred to a homogeneous mixture. The support rods are dipped in the separating medium consisting of these components. After the dipping the support rods retain a separating medium coating with a layer thickness of 250 to 350 μm. Then the support rods with the steel reinforcements hanging thereon are provided with a lacquering, especially a powder lacquering. It is to be obtained through the separating layer that this adheres better to the powder mass than to the support rods, so that, on withdrawing the support rods, the coating of the support rods formed by the powder lacquer remains together with the separating layer in the aerated concrete.

Apart from the fact that it is not known if this separating medium can completely fulfil its function also with corrosion protection coatings consisting of a water-lacquer, the known separating medium has various disadvantages. There is not here in question a product customary in the trade but it must be separately made from the components mentioned above, for which weighing units, time and mixers are necessary. The drying of the relatively thick coating layer requires a long time or special, energy-expending drying apparatus. The relatively thick coating of 300 μm on average can moreover be stripped off on pushing the support rods through the relatively narrow bores of the cross-piece or support frame and also on pushing into the spacers of the reinforcing mesh. Where the separating medium layer is stripped off there exists direct contact between the corrosion protection medium and the support rod. The corrosion protection medium will therefore stay adhered to the support rod at these places on withdrawal and at least a partial cleaning of the support rods is necessary. Furthermore the separating medium contains a high water content. This leads to corrosion of the support rods consisting of steel. The corroded (rusted) surface of the support rods is rough, so that on withdrawing the support rods from the aerated concrete block, at least part of the separating medium layer stays on the support rods. The same applies to such parts of the separating medium layer which lie at the upper ends of the support rods and are not sheathed with the corrosion protection medium when dipped therein. Aerated concrete residues can stay hanging here especially. In consequence at least a partial cleaning of the support rods is necessary in order to remove these residues.

SUMMARY OF THE INVENTION

The invention is based on the problem of developing a method for the treatment of support rods for holding steel reinforcement in the production of aerated concrete of the kind initially mentioned, which makes possible the use of cheap products customary in the trade as separating medium, in which a complete release of a corrosion protection layer consisting of a water-lacquer is ensured, no residues of aerated concrete adhere to the support rods and in which accordingly no cleaning of the support rods is required after each operating cycle.

This is obtained according to the invention in that the support rods, on use of a corrosion protection medium containing water as thinning medium, especially a water-lacquer, are dipped in a hot bath of molten paraffin or a similar, wax-like, water-resistant separating medium, which is solid at room temperature and has a softening temperature of about 50° to 70° C.

DETAILED DESCRIPTION

The paraffin or similar wax-like separating medium used in carrying out the method according to the invention are products customary in the trade and also relatively cheap. They can also be applied by adhering to suitable method requirements in very thin layer thicknesses as separating medium coating on the support rods, by dipping, a layer thickness of about 20 to 50$\mu$ being quite enough. The usage per support rod amounts only to 1 g. Apart from the small production costs of the separating medium the extremely small usage is therefore notably advantageous. Furthermore the small layer thickness has the advantage that the separating medium layer increases the diameter of the support rod practically not at all. In consequence the danger that the separating medium layer will be stripped off on pushing the support rods into the bores of the cross-pieces of the support frames and into the spacers of the reinforcing mesh is extremely small. The thin paraffin layer also adheres very well to the support rods and even where it has been stripped off, there always remains a residual film, which prevents the adhesion of remains of the corrosion protection coating on the support rod on withdrawing the same from the aerated concrete block. It has been ascertained that the corrosion protection coating releases from the support rod without residues and free from problems on withdrawing the support rods from the aerated concrete block and remains as an empty sheath in the aerated concrete block. The predominant separating action of the paraffin or another suitable, wax-like separating medium is attributable to the fact that the green aerated concrete block heats up strongly during the curing process. The temperature of the aerated concrete mass increases in this to about 80° to 90°, according to the proportion of binder. At these temperatures the paraffin is rendered molten. It thereby releases from the surface of the support rod and it forms a lubricant film between support rod and corrosion protection coating during the withdrawal of the support rod from the aerated concrete block. The molten paraffin also prevents the adhesion of aerated concrete to the upper regions of the support rod, where no corrosion protection coating is present. The support rods can thus be withdraw from the aerated concrete block completely clean and free from any kind of residues, be they corrosion protection medium or aerated concrete residues. Cleaning after each working process is in no way necessary. Moreover there remains on the support rod also after the withdrawal a thin paraffin film, which protects the support rod from corrosion before the application of a fresh paraffin coating. The support rods do not have to be dried after the application of the paraffin layer but it is sufficient for them to be cooled to room temperature. The paraffin layer hardens through this. The hardened paraffin layer remains neutral and does not affect the water-lacquer in any way on dipping the steel reinforcements and the support rods into the corrosion protection medium.

Advantageously the support rods are left in the paraffin bath long enough for them to attain approaching the temperature thereof. It has been ascertained that through this form of method a very thin separating medium layer of about 0.8 to 1 g can be attained. This thin separating medium layer has the advantage of a small usage of paraffin and moreover the danger of undesirable stripping of the paraffin layer is the smaller the thinner this layer is. In the use of a paraffin with a softening temperature of 52° to 54° C. and a paraffin bath temperature of 80° C., optimum results were achieved with an immersion time of about 5 minutes. The usage per support rod amounted to about 0.8 to 1 g.

In order to reduce the immersion time, the rods can be heated before the introduction to the paraffin bath. However additional devices are necessary for this.

In order to avoid these additional devices, the method can advantageously also be so carried out that the heating of the support rods is effected by the warming aerated concrete block in the curing, in that the support rods are pulled out of the aerated concrete block at the end of the curing and immersed while still warm in the paraffin bath. This immersion of the support rods directly after their withdrawal from the aerated concrete block is possible, since the support rods can be withdrawn from the aerated concrete block clean and residue-free and do not first have to be cleaned.

It is furthermore advantageous if the support rods are left to cool to room temperature after the immersion in the paraffin bath and before the application of the water-lacquer. In this manner hardening of the paraffin layer of the support rods is achieved and no kinds of any components of the paraffin can get into the separating medium bath. Since the corrosion protection medium bath is at room temperature, it is also possibly sufficient if the support rods are brought to room temperature only on immersion in the corrosion protection medium bath, since on the immersion the paraffin likewise hardens.

In the investigation of various paraffins with different softening temperatures and different purity paraffins with a softening temperature of about 52° to 56° C., preferably with a softening temperature of 52° to 54° C., have proved especially suitable. With paraffin with the last-mentioned softening temperature there was the smaller paraffin usage per support rod of about 0.8 to 1 g. Relative to usage there was no difference between paraffin of high purity, namely AGN-paraffin 1035 of the firm Alfred Graf, Nürnberg and raw paraffin 10107 of Deutsche Texaco AG, Chemie Sparte Paraffine and Wachse, Hamburg. The cost for raw paraffin however amounts to only ⅓ of the AGN-paraffin, since raw paraffins contain 2 to 3% oil.

Both paraffins with softening temperatures of 52° to 54° C. gave an excellent separating effect. The support rods were clean over their whole length, where they had come into contact with corrosion protection medium or aerated concrete. Paraffins with higher softening temperatures, for example 62° to 64°, likewise gave a relatively small usage of 1 g/support rod. Here however the separating effect is smaller with respect to aerated concrete in the region of the rising head of the aerated concrete block, namely where the paraffin layer was not additionally sheathed with corrosion protection medium. Possible caking of green aerated concrete was noted. At still higher softening temperatures an increased usage of paraffin was noted. Particularly worthy of recommendation are therefore paraffins with softening temperatures from 52° to 54°, since the paraffin is liquid over the whole length on drawing out the rods and the best separating effect is thus obtained. In order that caking of green aerated concrete on the support rod shall be avoided, it is important that the support rods are provided with a separating layer of paraffin over their whole length which can in any way come into contact with corrosion protection medium or with aerated concrete. The support rods with the steel reinforcement should be immersed in the corrosion protection bath only so far as is necessary, since this leads to the best results of the separating action. By this it is also ensured that the corrosion protection medium sheath remains in the aerated concrete on drawing out the support rods.

When using paraffins with softening temperatures of 52° to 65°, the paraffin bath is advantageously heated to a temperature of around 80° C. and kept at this temperature also when immersing the support rods by suitable measures, such as heating and insulation.

Advantageously it is so arranged that the thickness of the paraffin coating applied to the support rods amounts to approximately 10 to 50 μm, preferably about 20 to 25 μm, regardless of the softening temperature of the paraffin, the bath temperature and the dipping time, having regard to possible pre-heating of the support rods. The last-mentioned coating thickness range corresponds to a quantity of about 0.8 to 1 g paraffin per support rod.

Through the present protective rights there is to be protected also the use of paraffin or a similar wax-like material, which is solid at room temperature and has a softening temperature of about 50° to 70° C., preferably 52° to 54° C., as separating medium for support rods for the steel reinforcements in the production of aerated concrete, wherein the support rods and the steel reinforcements are provided with a corrosion protection coating of water-lacquer after the application of the separating medium.

The method according to the invention can be carried not only in conjunction with water-lacquer but with any other corrosion protection medium containing water as thinner, for example cement slurry.

I claim:

1. A method for the treatment of support rods adapted to hold steel reinforcement members during a manufacture of steel reinforced, aerated concrete forms, comprising the steps of:

first immersing the support rods in a hot bath of molten paraffin, which is solid at room temperature and has a softening temperature in the range of 50° C. to 70° C., thus forming a coating of a separating medium on the support rods;

removing the support rods from the bath and cooling them generally to room temperature;

connecting the reinforcement members so that they are suspended from the support rods;

coating the reinforcement members together with the support rods with a corrosion protection medium containing water as a thinning agent with the adhesion of the corrosion protection coating, thus formed on top of the coating of the separating medium, on the support rods being prevented by said coating of the separating medium;

inserting the support rods and the reinforcement members suspended thereon together into a mold;

subsequently filling the mold with an aerated concrete mass;

after curing and a sufficient solidification of the aerated concrete mass, the support rods are released from the reinforcement members, with the coating of the separating medium having been heated by the heat created during the curing of the aerated concrete mass to a temperature above the softening temperature to thereby liquify the separating medium; and finally removing the support rods from the aerated concrete mass without the reinforcement members, the liquid separating medium forming a lubricant film between each respective support rod to facilitate the removal, the corrosion protection coating formerly on the separating medium on the support rod remaining in the aerated concrete mass.

2. The method according to claim 1, wherein the support rods are left in the paraffin bath until they have attained approximately the temperature thereof.

3. The method according to claim 1, wherein the support rods are heated before introduction to the paraffin bath.

4. The method according to claim 3, wherein the heating of the support rods is effected by the aerated concrete mass heating in the curing stage, wherein the support rods are pulled out of the aerated concrete mass at the end of the curing and are dipped while still warm into the paraffin bath.

5. The method to claim 1, wherein paraffin with a softening temperature of about 52° to 65° C. is employed.

6. The method according to claim 1 wherein paraffin with a softening temperature of about 52° to 54° C. is employed.

7. The method according to claim 5, wherein the paraffin bath is heated to a temperature of about 80° C. and is kept at this temperature also when dipping the support rods.

8. The method according to claim 1, wherein the thickness of the paraffin coating applied to the support rods is in the range of 10 to 50 μm regardless of the softening temperature of the paraffin, the bath temperature and the dipping time, having regard to possible preheating of the support rods.

9. The method according to claim 8, wherein the thickness of the paraffin coating is in the range of 20 to 25 μm.

10. The method according to claim 1, wherein the corrosion protection medium is a water-lacquer.

11. A method involving the use of paraffin, which is solid at room temperature and has a softening temperature in the range of 50° C. to 70° C. as a separating medium for support rods which function as a support for steel reinforcement members in the production of aerated concrete forms, wherein the support rods are first coated with the separating medium and thence both of the support rods and the steel reinforcement members are coated with a corrosion protection coating of water-lacquer, the adhesion of the corrosion protection coating formed on top of the separating medium coating on the support rods being prevented by the said coating of the separating medium.

12. The method according to claim 11, wherein the softening temperature is in the range of 52° C. to 54° C.

* * * * *